United States Patent [19]
Heath

[11] Patent Number: 5,094,871
[45] Date of Patent: Mar. 10, 1992

[54] METHODS FOR PROCESSING AND RECONSTITUTING OLIVE PULP

[76] Inventor: George F. Heath, 27215 A Ave. 140, Porterville, Calif. 93257

[21] Appl. No.: 638,382

[22] Filed: Feb. 15, 1991

Related U.S. Application Data

[63] Continuation-in-part of Ser. No. 505,518, Apr. 6, 1990, abandoned, which is a continuation-in-part of Ser. No. 339,293, Apr. 17, 1989, abandoned.

[51] Int. Cl.$^5$ .................. A23L 1/0532; A23P 1/12
[52] U.S. Cl. ................... 426/573; 426/512; 426/516; 426/615
[58] Field of Search ............. 426/573, 615, 512, 516

[56] References Cited

U.S. PATENT DOCUMENTS

| | | | |
|---|---|---|---|
| 2,805,951 | 9/1957 | Kagley et al. | 426/615 |
| 2,914,005 | 11/1959 | Gorozpe | 426/516 |
| 3,002,839 | 10/1961 | Levinson et al. | 426/615 |
| 3,085,881 | 4/1963 | Ball | 426/615 |
| 3,198,639 | 8/1965 | Webster | 426/615 |
| 4,141,287 | 2/1979 | Becker et al. | 426/615 |
| 4,347,261 | 8/1982 | Challen et al. | 426/573 |
| 4,369,198 | 1/1983 | Uchi et al. | 426/598 |
| 4,436,759 | 3/1984 | Trilling et al. | 426/516 |
| 4,452,744 | 6/1984 | Finch et al. | 260/412.2 |
| 4,463,023 | 7/1984 | McCorkle et al. | 426/516 |
| 4,664,926 | 5/1987 | Scrimshire | 426/615 |

Primary Examiner—Donald E. Czaja
Assistant Examiner—Helen Pratt
Attorney, Agent, or Firm—Beehler & Pavitt

[57] ABSTRACT

A process for preparing olive products in the form of cylinders of olive meat from culled olives and otherwise wasted olive pulp. The initial basic process involves removing stems and pits, homogenizing the pulp, mixing it with a caustic solution to reduce the bitterness, acidifying the pulp after filtering, and storing. From this basic process, the stored pulp may be further processed, either to produce a black ripe olive product, or a Spanish type olive product. For the black ripe olive product, the stored pulp is washed, divided into two equal portions and each portion is mixed with a different formula, following which the two portions are mixed together and either extruded or molded as a cylindrical tube of olive meat and sprayed with tannic acid and ferrous gluconate, then washed. For the Spanish type olive product, the stored pulp is pickled for fermentation, then filtered and mixed with formula ingredients and heated and extruded, while simultaneously a pimento pepper pulp formulation is prepared, heated and extruded internally of, and coaxially with, the olive pulp extrusion to produce a cylinder of olive meat with a pimento core. The extrusions may be cut into slices, wedges or dice.

8 Claims, 10 Drawing Sheets

BLACK RIPE PROCESS-ADDITION TO FIG.1

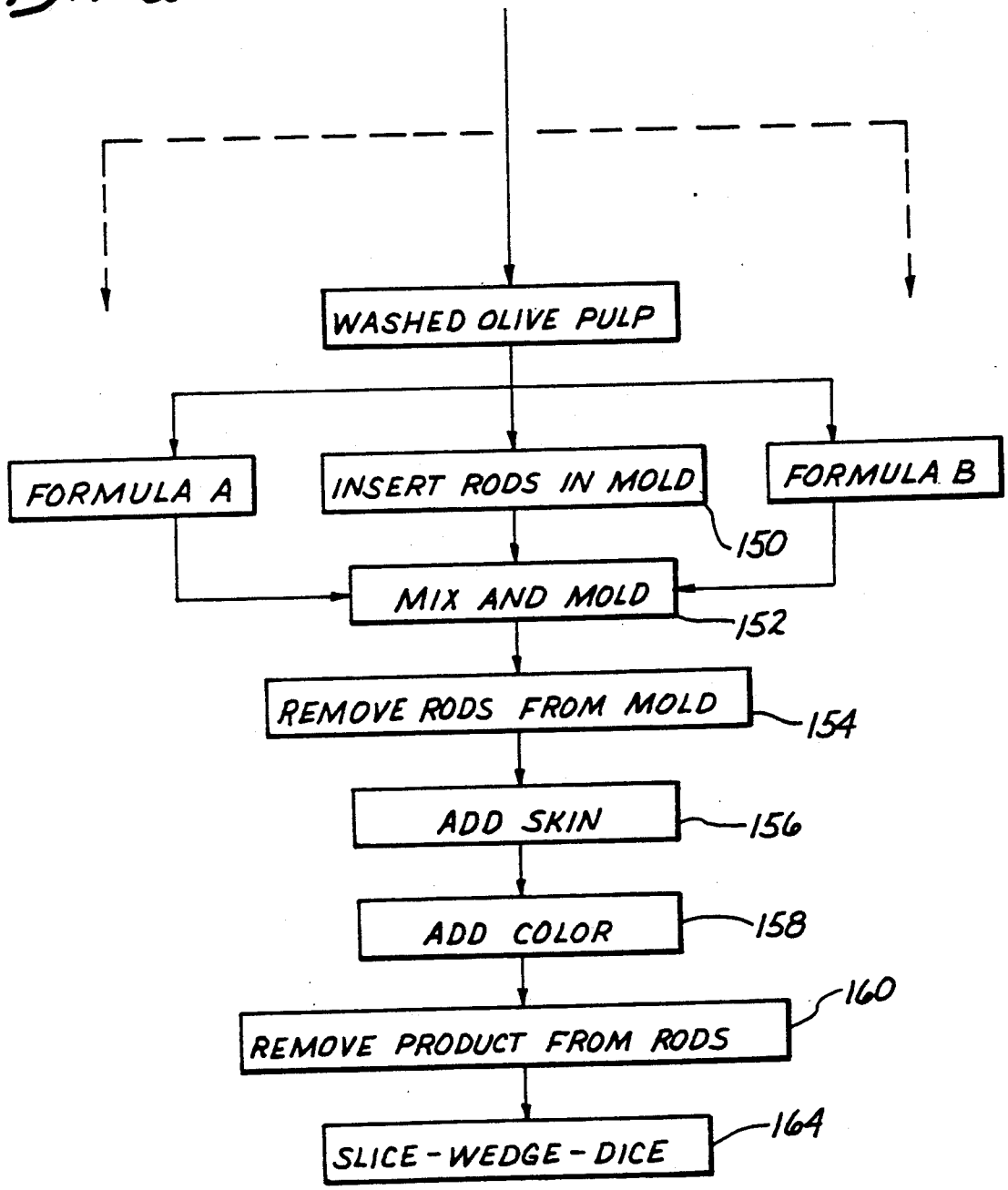

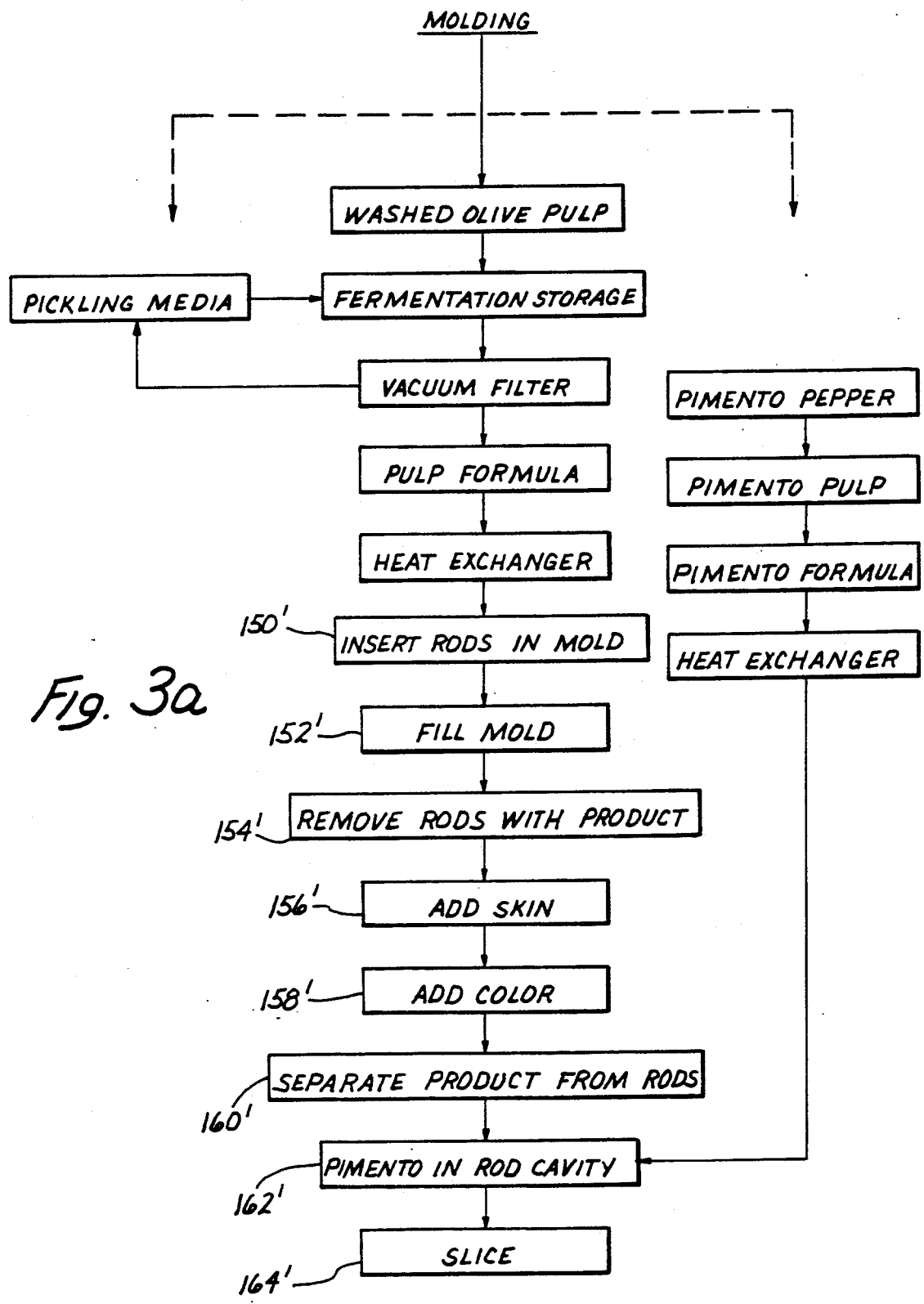

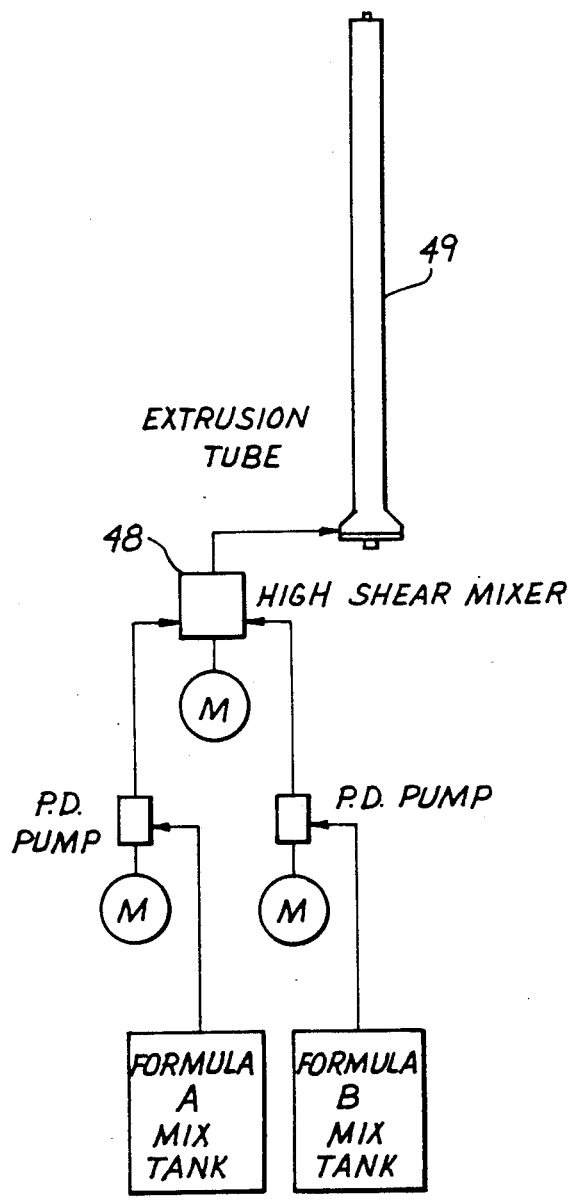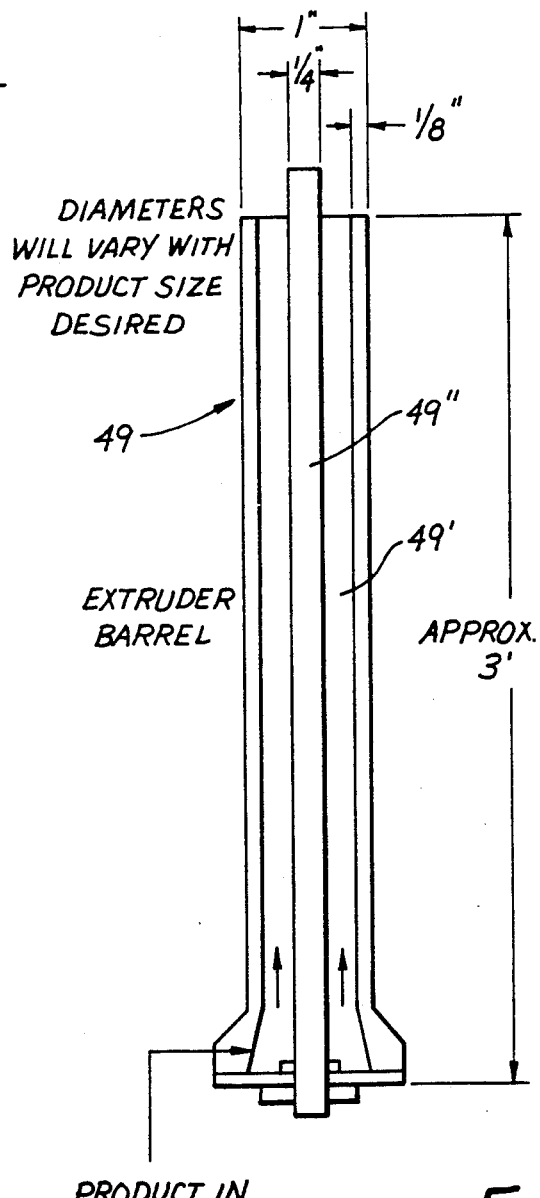

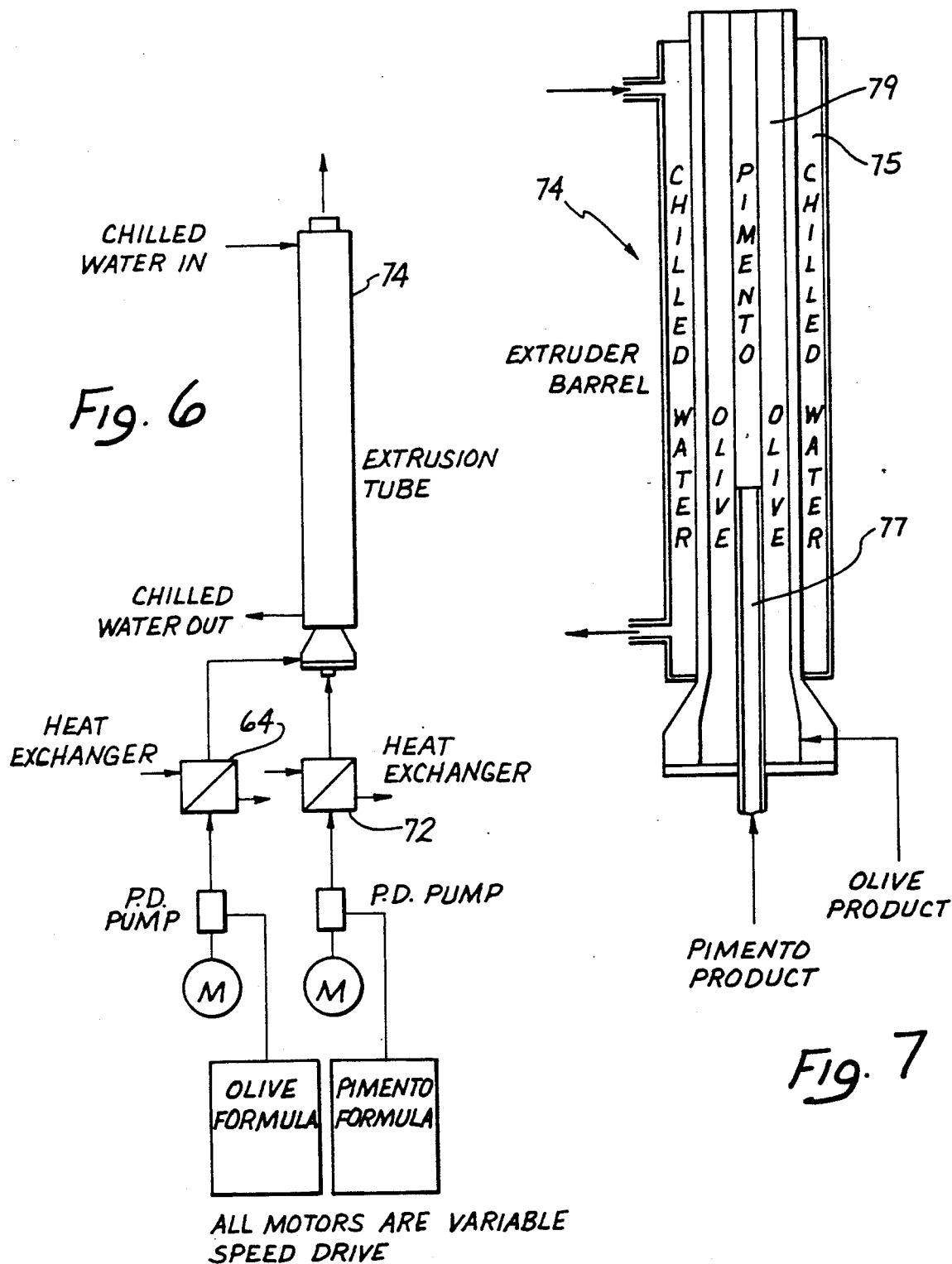

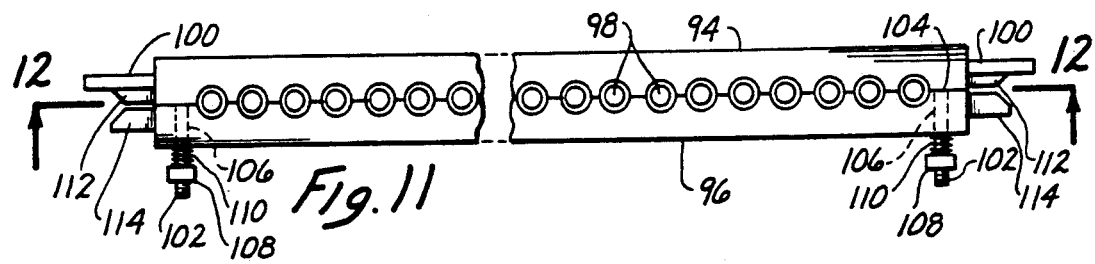
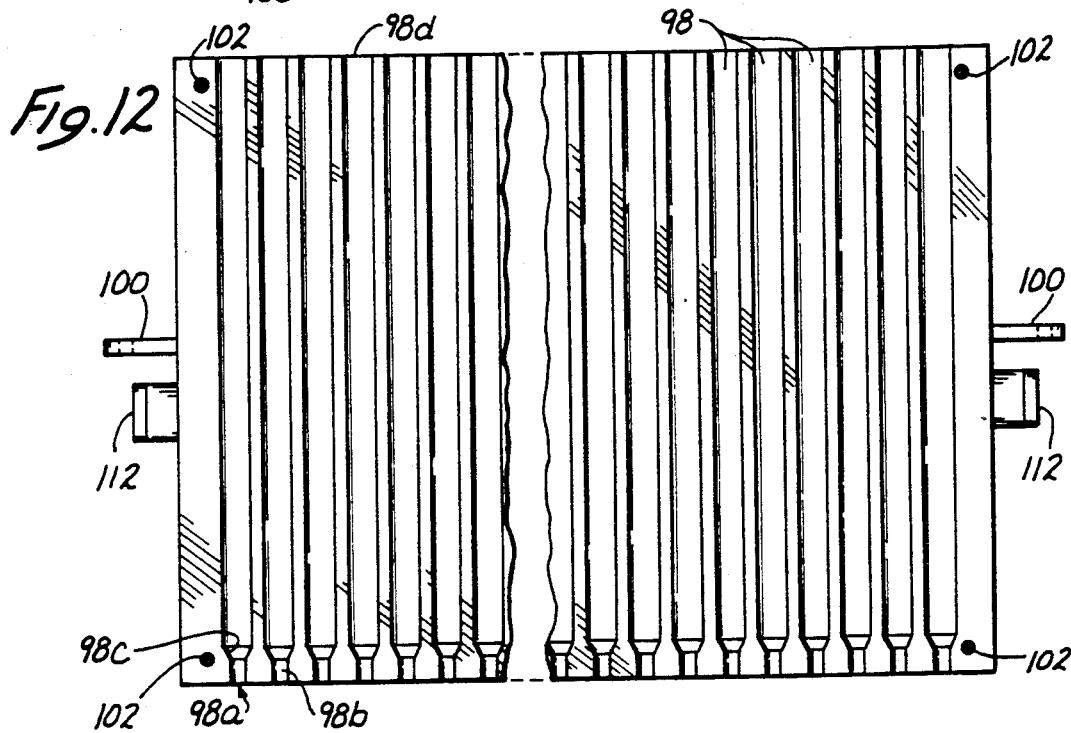
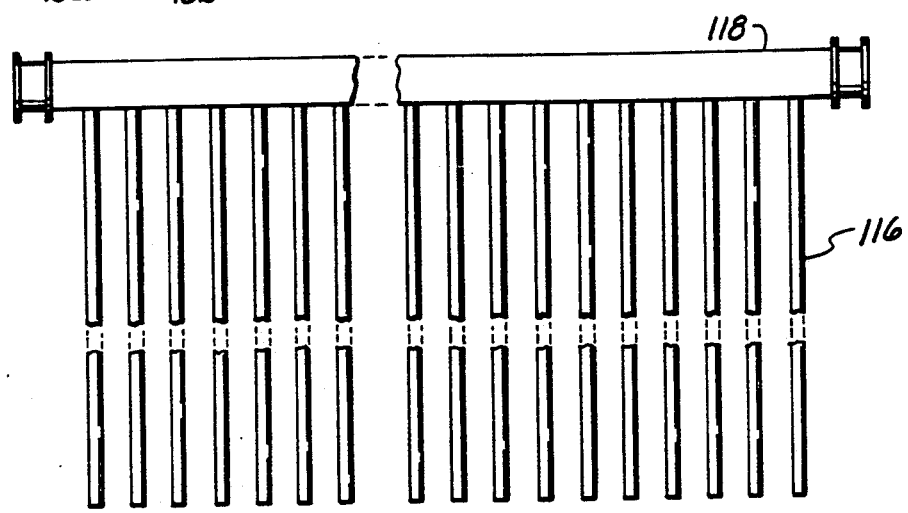

METHODS FOR PROCESSING AND RECONSTITUTING OLIVE PULP

This application is a continuation-in-part of application Ser. No. 07/505,518 filed Apr. 6, 1990 which was a continuation-in-part of application Ser. No. 07/339,293 filed Apr. 17, 1989. Application Ser. No. 07/505,518 is about to be abandoned, now abandoned and the previous application Ser. No. 07/339,293 has been abandoned.

FIELD OF THE INVENTION

This invention relates to the processing of olives culled for being undersized, oversized, or overripe, and reconstituting them into a usable olive type food product.

BACKGROUND OF THE INVENTION

Originally all of the olives grown in this country were used for oil. The fruit was allowed to ripen on the trees until the oil content was high before picking. At this stage of maturity the oil content of the olives was as high as sixteen percent.

Around the turn of this century foreign oil imports drove many of the domestic oil producers out of business. The remaining producers changed from producing oil to producing "Spanish Style Olives", and eventually also what is called "California Black Ripe Olives". The olives for those two products are picked before they turn color so that the flesh of the fruit is firm and can withstand processing. The oil content of the fruit at that stage of maturity is only in the range of five to six percent.

Despite the efforts to pick olives suitable for such processing, it has been necessary to cull from the picked crop those olives which are undersized, oversized, or overripe. These culled olives have been regarded as having no commercial value. Consequently, for the past seventy years the culled olives have been wasted. Today, the culls, averaging between ten and twelve percent of the annual crop, are burned or taken to a landfill.

Culled olives have not been profitably used in their natural form due to processing costs, or to the reduction in quality from the rigorous processing they would have to endure.

DESCRIPTION OF THE PRIOR ART

Olives are not readily edible off the tree, even when ripe, because they contain oleuropein, a glucide, which is offensive to the human taste. Oleuropein can be hydrolized by a caustic solution, such as sodium hydroxide, potassium hydroxide or the like, and thereby, rendered non offensive. Accordingly, after olives ripen on the tree and are picked, various processes have been used to make them edible. These processes, called "curing", have been developed over the years by olive growers and handed down through history. In general, such processes are now used commercially in olive processing and packing plants.

The present industry wide method of processing olives is the seven day process. The process consists of a series of steps using the caustic solution to hydrolize the oleuropein and an acid solution to neutralize the causticity. Each time the caustic solution is applied, the caustic cuts deeper into the olive meat, hydrolizing the oleuropein. Each time the acid solution is applied, the causticity is neutralized. If the olives are to be the "black ripe" style, air is sparged through the olives during the acid solution parts of the process. The steps in the process continue until the caustic solution has penetrated the olives to the pits. Ferrous gluconate is added to the final acid washwater solution for the "black ripe" product to produce additional black color to the olive skin. The green olives can be canned as "green ripe" style or they can be placed in a pickling solution and fermented to produce a "Spanish style" olive.

However, prior to the present invention, no satisfactory process has been devised which enables cull and pitting waste to be reconstituted as an acceptable marketable food product.

SUMMARY OF THE INVENTION

The present invention provides a series of steps whereby olive culls and pulp waste may be processed to produce a reconstituted product that has the texture, appearance and taste of olives after they have been processed in the conventional manner. After the pulp has been processed in accordance with the present invention, it may be extruded and/or molded into extended shapes for slicing or chopping into marketable product forms. The process, moreover, lends itself to producing the California type of black olives, or alternatively the "Spanish olives".

The result of employing the processes of the present invention is a considerable saving of the olive crop, i.e. as much as 10% to 12%. In addition, processing time and expense of producing reconstituted olive products is greatly reduced.

DESCRIPTION OF THE DRAWINGS

FIG. 2a is similar to FIG. 2, but showing steps for molding instead of extruding the product.

FIG. 3a is similar to FIG. 2, but showing steps for molding instead of extruding the product.

FIG. 4 is a block diagram showing the manner in which the processed pulp is moved to the extruder for the black ripe olive process.

FIG. 5 is a sectional view of a preferred form of the extruder shown in FIG. 4.

FIG. 6 is a block diagram showing the manner in which the processed pulp is moved to the extruder for the Spanish style olive process.

FIG. 7 is a sectional view of a preferred form of the extruder shown in FIG. 6.

FIG. 11 is a top view of the mold looking in the direction of the arrows 10—10 in FIG. 9.

FIG. 12 is a section of the mold as seen in the direction of the arrows 11—11 in FIG. 10.

FIG. 13 is a side elevation of a set of mold rods adapted for insertion in the cavities of the mold shown in FIGS. 10 and 11.

DETAILED DESCRIPTION OF THE PROCESSING

A. Preliminary Processing

Figure 1:
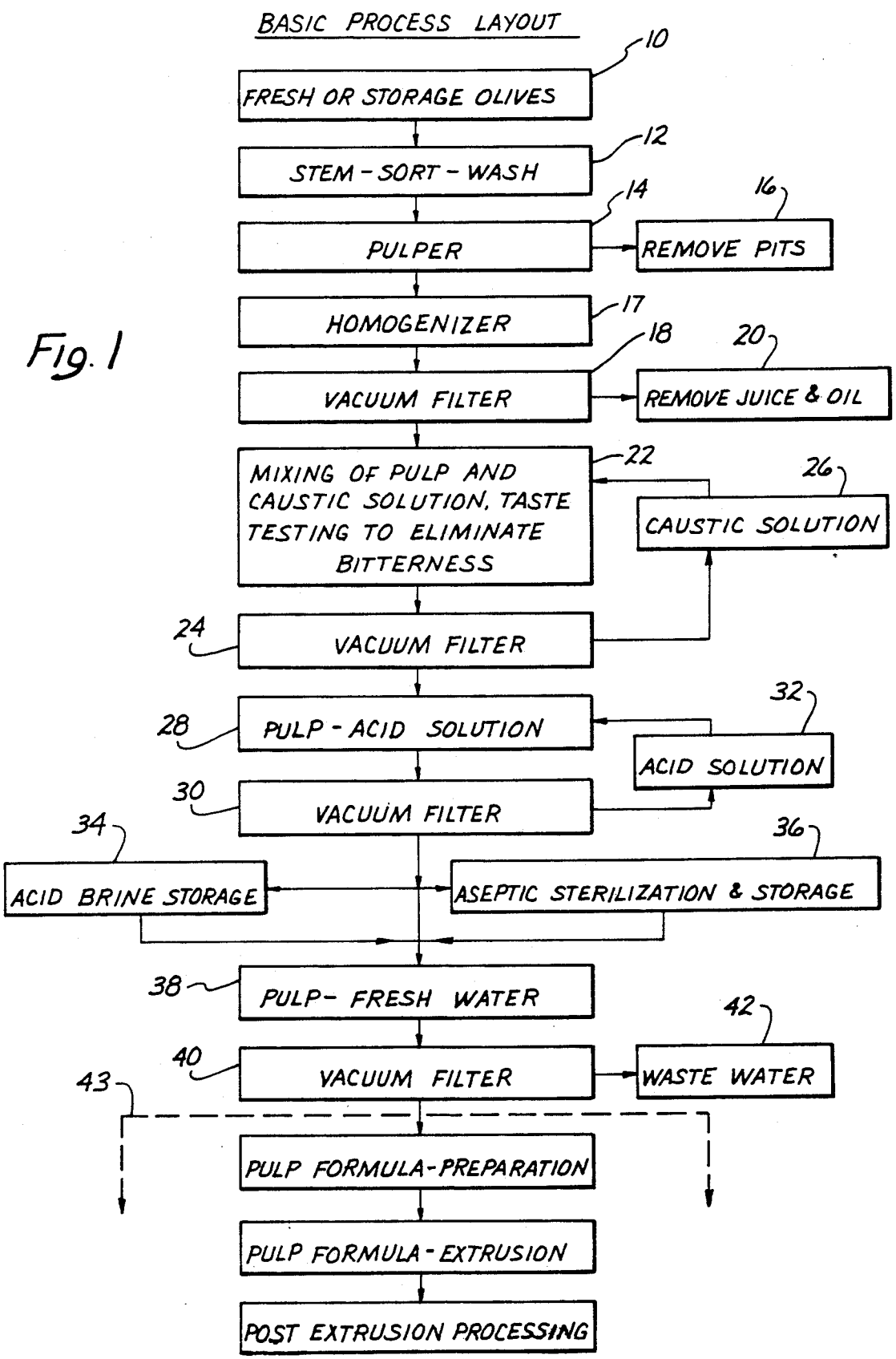
FIG. 1 is an overall block diagram showing in detail the initial steps to prepare the pulp for the final alternative procedures to achieve the processed products.

Referring to FIG. 1 of the drawings, the process is practiced in its preferred embodiment by utilizing the following initial steps illustrated in the block diagram:

Fresh or stored olives 10, may move directly to the first processing step 12 in which they are stemmed, sorted and washed. Should the olives be stored prior to processing steps 12, the olives would be placed in an acid brine solution, comprised as follows:

| Fresh water | 98% |
|---|---|
| Calcium Benzoate | 0.4% |
| Calcium Chloride | 0.6% |
| Acetic Acid | 1.0% |
| (maintain a pH of | 4.0%) |

After the olives have had their stems and other trash removed, they would then be sorted and washed (block 12), following which, the olives are passed to the pulper 14 (block 14).

The pulper, (which may be a FMC Model 100) removes the olive meat from the pits and then discards the pits (block 16). The olive meat from the pulper 14 will be coarse and non-uniform in size. Desirably, therefore, the olive pulp is passed through a homogenizer 17 (such as an Urschel Model 1700), where the pulp is homogenized to a uniform consistency.

After the homogenization, the pulp is passed through the filter area 18 (which may employ a Reitz S-Press or Lux Metals Vacuum Belt) and the free liquid 20 (comprising juice and oil) is removed. The liquid 20 from the olive may contain 6% to 7% olive oil, and this can be recovered. A small percentage of the juice remaining will be retained for later use, the balance of the juice being discarded.

The pulp may be next passed to a ribbon mixer (block 22) (e.g. a Jacobson Model 5410), and a 1% solution of sodium hydroxide is added. Every ten minutes of mixing, a sample of the pulp is taken, washed in fresh water and taste tested for bitterness.

After a satisfactory taste test (i.e. bitterness is minimized), the pulp passes to another vacuum filter 24 to remove the free liquid as has been done in block 18.

At this point, as shown in block 26, the sodium hydroxide solution taken from the pulp by the vacuum filter 24 to which the mixed pulp is next subjected, can be adjusted to the 1% solution strength and reused by passing it back to the ribbon mixer 22.

The pulp passes from the filter 24 into another ribbon mixer 28 (again a Jacobson Model 5410), and a 1% solution of acetic acid is added. As the slurry is mixed, the pH is tested. Additional acid may be added until the pH of the slurry is stabilized at 6.5. At that point any residual sodium hydroxide has been neutralized.

After pH stabilization, the pulp passes to a third filter 30 to remove the free liquid, in the same manner as block 18.

The acetic acid solution 32 taken from the pulp by filter 30 can be adjusted to the 1% solution strength and reused.

If the pulp is not needed for further processing at the time, it must be properly stored (block 34). However, it could be immediately further processed as hereinafter described. If first stored, the storage solution previously described at the outset would be used. The storage tank should be fully enclosed and a nitrogen atmosphere injected to cover the surface of the storage solution.

The most desirable method of storing the olive pulp would be to pass the pulp through an aseptic sterilization system 36 (such as offered by John Dole Co.), and storing "bulk packed" pulp in a warehouse. This method of storage would allow the pulp to retain its fresh color and texture. The pulp may be retained in storage for anywhere from one to four months.

If not stored, or when the pulp is to be withdrawn for further processing, the pulp is washed in fresh water (block 38) following which the pulp passes through a vacuum filter 40 to remove the free liquid in the same manner as was done at block 18.

The liquid from the filter may be discarded as waste water (block 42) or reused as make-up water in areas of the processing.

At this point (line 43 in FIG. 1) the pulp has been prepared for the application of a mixer formula for reconstituting the pulp to produce a black ripe olive product, or for further steps and a formulation to produce a Spanish style type olive product.

B. Black Ripe Process

Figure 2:
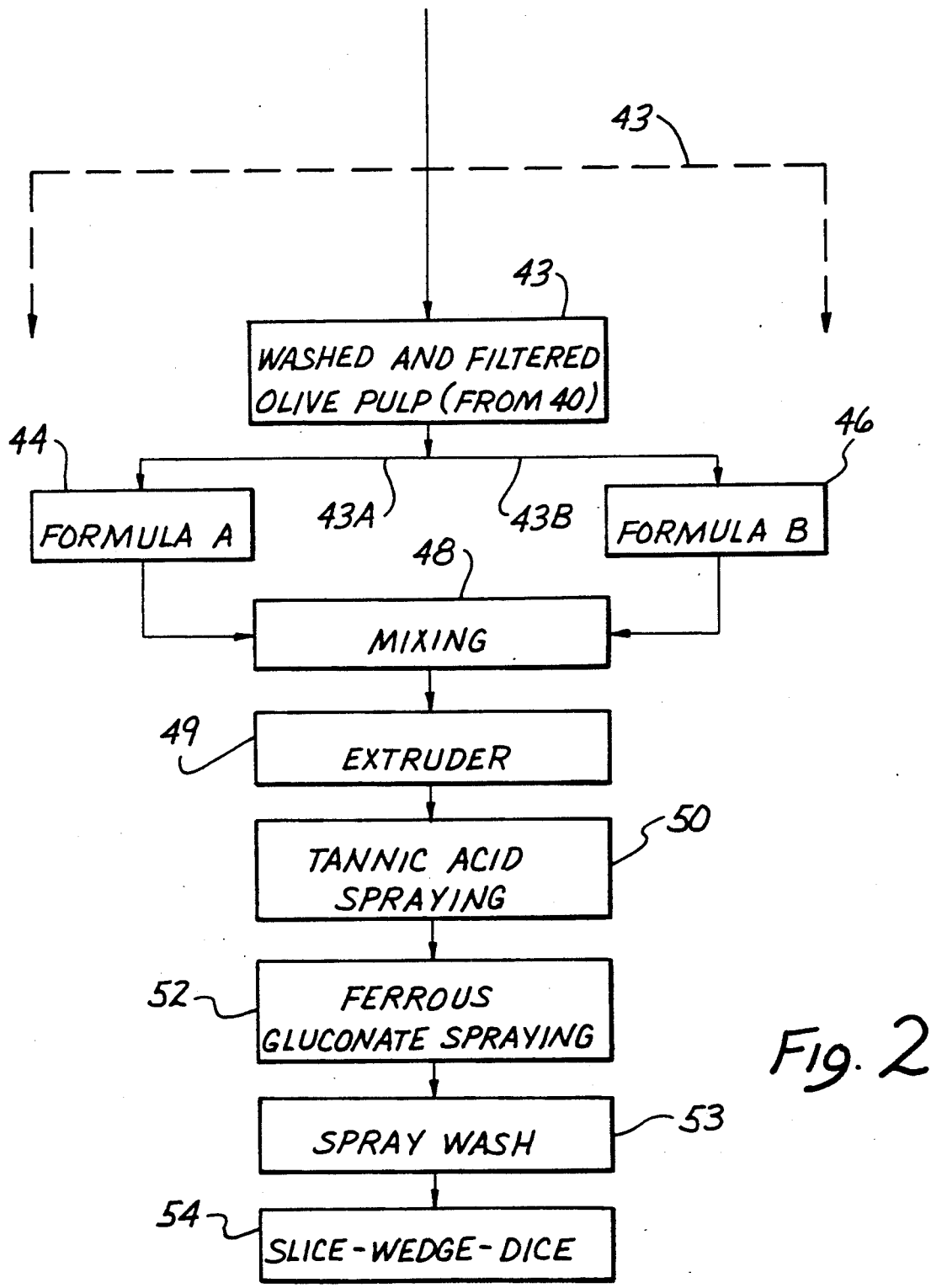
FIG. 2 is a detail diagram showing the final steps taken to produce a "black rip" product by extrusion following the initial steps of FIG. 1.

For the black ripe style product, reference is made to FIG. 2 of the drawings.

The pulp is divided as shown at 43A and 43B and equal amounts pass into two ribbon mixing tanks 44 and 46 where the pulp in each tank will receive its own formulation "A" and "B", respectively,

| Mixer Formula "A" | |
|---|---|
| Olive Pulp | 45% |
| Water (Demineralized) | 51% |
| High-guluronate alginate (Protan Inc.) | 3.0% |
| Sodium Hexametaphosphate | 0.8% |
| Mixer Formula "B" | |
| Olive Pulp | 45% |
| Water (Demineralized | 45.8% |
| Olive Oil | 3.0% |
| SOLKA-FLOC (BW40) | 4.0% |
| Guar Gum | 0.3% |
| Calcium Sulfate | 1.5% |
| Calcium Propinate | 0.4% |

Equal volumes of the two pulp formulas "A" and "B" are pumped into a high shear mixer 48 (such as a Scott TURBO) which, after mixing, delivers the mixtures to either an extruder 49, should an extrusion process be used, or to a manifold 90 (FIG. 8) for filling molds, if the product is to be molded as hereinafter described.

In the extrusion process, when the mixtures are delivered to an extruder 49, the calcium components activate the alginate and gelling immediately starts to occur. The phosphate in the mixture is used to control the gelling rate so that the product gels in the barrel 49' (FIG. 5) of the extruder 49' and not in the high shear mixer 48.

The extruder barrel 49' is a tube with the inside diameter sized to achieve the desired outside diameter of the extruded product. A small diameter concentric rod 49'' extending the length of the extruder barrel 49' is provided to give the extruded product a center hole which is usually desired.

When the extruded product (not shown) emerges from the barrel 49', a 1% solution of tannic acid is sprayed over the product (block 50, FIG. 2).

The product then passes through a spray of ferrous gluconate (block 52). The combined sprays impart a skin-like look and feel to the product that includes the desired black color. The tannic acid and surplus ferrous gluconate are washed off in a water spray (block 53).

The product in a black tube form is next moved to the cutting area where it is cut to the desired form of slices, wedges or diced (block 54).

Figure 3:
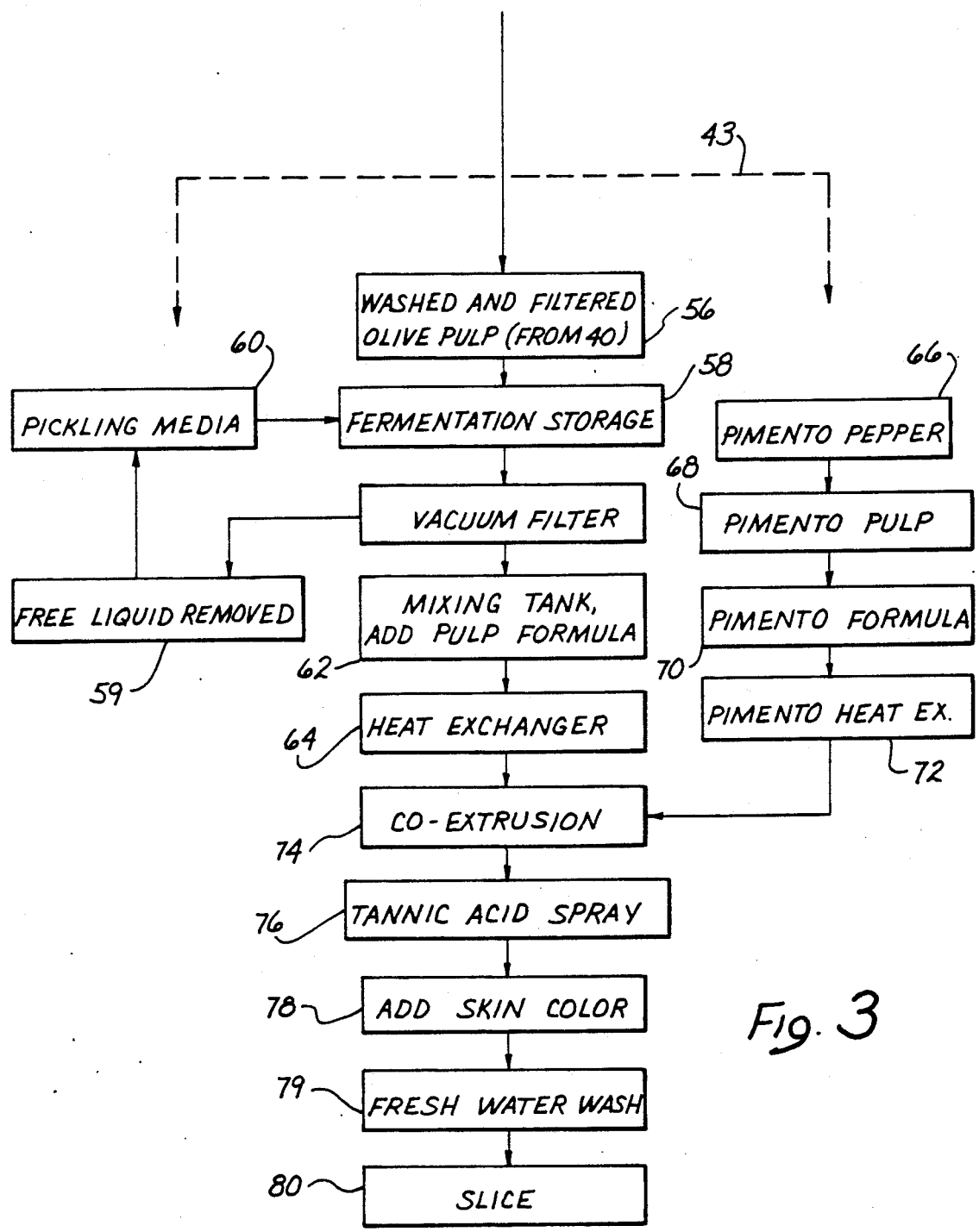
FIG. 3 is a detail diagram showing the final steps taken to produce a "Spanish style" product by extrusion, also following the initial steps of FIG. 1.

C. Spanish Style Product Process

Where it may be desired to produce a Spanish style olive product, reference should be made to FIGS. 3 or 3a (depending upon whether the product is to be extruded or molded) each of which figures also starts at line 43 of FIG. 1. The process is as follows:

The washed and filtered pulp (from 43) for Spanish style products is placed in storage tanks (block 56) and a pickling solution (block 60) is added. The pulp will remain in the tanks until fermentation is complete and the pH of the pulp stabilizes at 3.5 to 4.0. This storage time may be of the order of several months.

For a suitable pickling solution, to each 6,000 gal. water there may be added:

Sodium Chloride to a concentration of 48 salometers.
Calcium Chloride 1,200 pounds
Lactic Acid 2,000 ml.
Dextrose (corn sugar) 20 to 30 lbs.

When the fermentation is complete, the pulp may be passed through a vacuum filter (block 58) and the free liquid (block 59) is removed, in a manner similar to block 18.

The liquid 59 from the filter 57 may have the formulation adjusted and can be re-used as pickling medium (block 60).

The pulp then is moved to a mixing tank 62 (another Jacobson Model 5410) where formula ingredients are added, such as:

| Formula: | |
| --- | --- |
| Olive Pulp | 45% |
| Water (demineralized) | 46.5% |
| Olive oil | 3% |
| A dietary food grade cellulose fiber (such as SOLKA-FLOC BW40) | 4% |
| Guar Gum | 0.5% |
| A heat activated alginate, such as PROTANAL SF120 sold by Protan Inc. of North Harbor, New Hampshire | 0.5% |
| Calcium Carbonate | 0.25% |
| GDL (Glucono-Delta-Lactone) | 0.25% |
| Olive Juice | Bitter Flavor to Taste |

The pulp, after mixing with the ingredients of the last described formula, passes through a heat exchanger (block 64) where the temperature of the mixed pulp is raised to 175-180 degrees Fahrenheit and thus readied for co-extrusion at 74 with a pimento addition prepared as follows:

Pimento pepper 66 is stemmed and seeded, then pulped (block 68) to a homogenous consistency, and sent to a ribbon mixer 70 (Jacobson Model 5410) and ingredients are added to the following formula:

| | |
| --- | --- |
| Pimento pulp | 45% |

| -continued | |
| --- | --- |
| Water | 54.7% |
| PROTANAL SF 60 (Protan Inc.) | 0.2% |
| Guar Gum | 0.1% |

The pimento pulp also passes through a heat exchanger (72) where its temperature is raised to 175-180 degrees Fahrenheit.

In the extruding process, the olive and pimento ingredients, each to its own formula described above, are then pumped into the extruder 74 which has a cooling shell 75 encasing it. The extruder comprises barrels formed by concentric tubes 77, 79 with the inside diameter of the outer tube 79 sized to give the outside diameter of the product (not shown) the desired size. Inside the larger tube 79 is a smaller short tube 77. The olive pulp is extruded through the outer tube 79, while the pimento pulp is extruded through the inner tube 77. The resultant product 80 is a continuous cylinder of olive meat with a pimento core (not shown).

The heating through the heat exchangers 64, 72 activates the gelling action and the cooling, upon extrusion, allows the gelling action to take place.

When the extruded product emerges from the barrels, a 1% solution of tannic acid may be first sprayed over the product (block 76), followed by a spray of green food coloring (block 78). The combined sprays 76, 78 impart the look, feel and color of natural olive skin. An additional spray 81 of fresh water washes off the tannic acid and surplus color.

The extruded product is then moved to the cutting area 82 where the product may be sliced, wedged, diced or into rods or sticks.

Although a method and apparatus have been described for extruding the reconstituted pulp product, the preferred manner of forming the same would be by molding in apparatus of the type shown in FIGS. 8-13.

Referring first to FIGS. 9-12 inclusive, there is shown a single row mold 92 formed of two halves 94 and 96 which define a plurality of cavities 98. Chain mounting brackets 100 are provided at each end of the mold on the mold half 94. The molds are coaligned by pins 102 which are also secured to the mold half 94 and project normally from the cavity face 104 of the mold half 94 and extend through holes 106 in mold half 96 near its ends. Nuts 108 may be employed to hold retainer springs 110 on the pins 102. These springs 110 are of such strength as to hold the two mold halves 94 and 96 together in the absence of a counter force. Such counter force, however, may be provided by wedging between projections 112 and 114 extending from each end of the mold halves 94, 96 respectively.

The lower end 98a of each mold cavity is formed with a section of 98b of reduced diameter which is connected to the main mold cavity 98 by a tapered intermediate section 98c.

Mold rods 116 (FIG. 13) are provided on a rack 118. These mold rods are equal in number to the number of cavitities 98 of the single row mold 92 and are spaced from each other to be disposable coaxially in each of the mold cavities 98. The outside diameter of each of the rods 116 is only slightly less than the inside diameter of each reduced diameter section 98b of the mold cavities 98, for the length of the mold cavity 98, but then is slightly less in diameter than the cavity 98 itself so as to close the top end 98d of the cavity when the rod 116 is fully inserted in the mold cavity 98.

Figure 8:
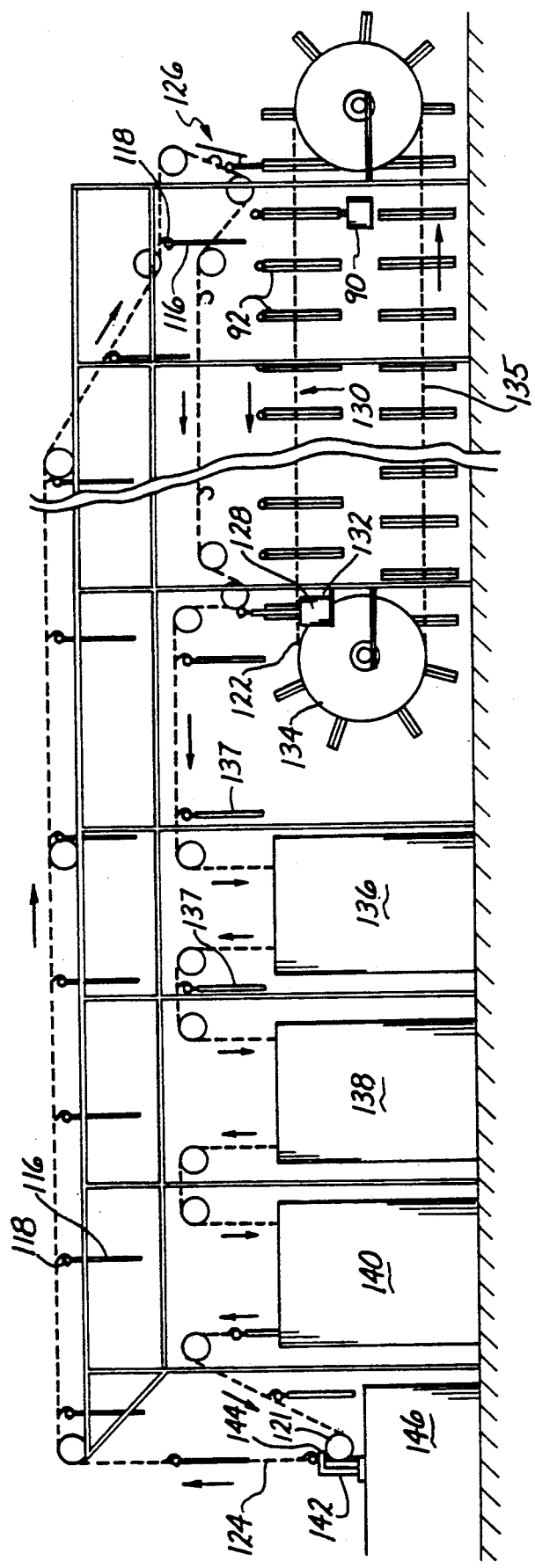
FIG. 8 is a side elevation partly schematic of apparatus to accomplish molding of reconstructed olive meat.
Figure 10:
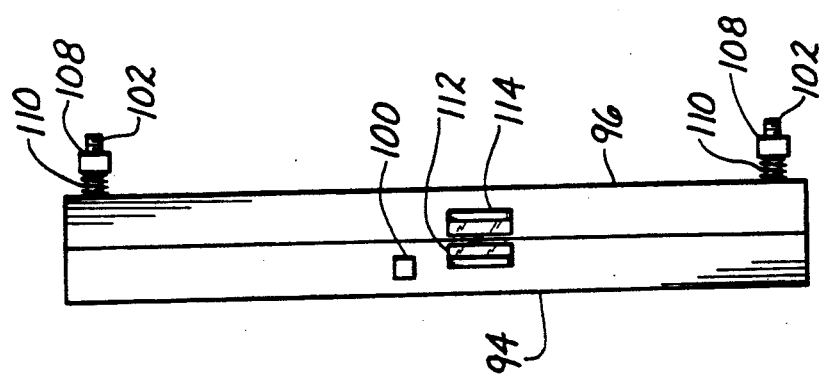
FIG. 10 is a side elevation of the mold shown in FIG. 9.
Figure 9:
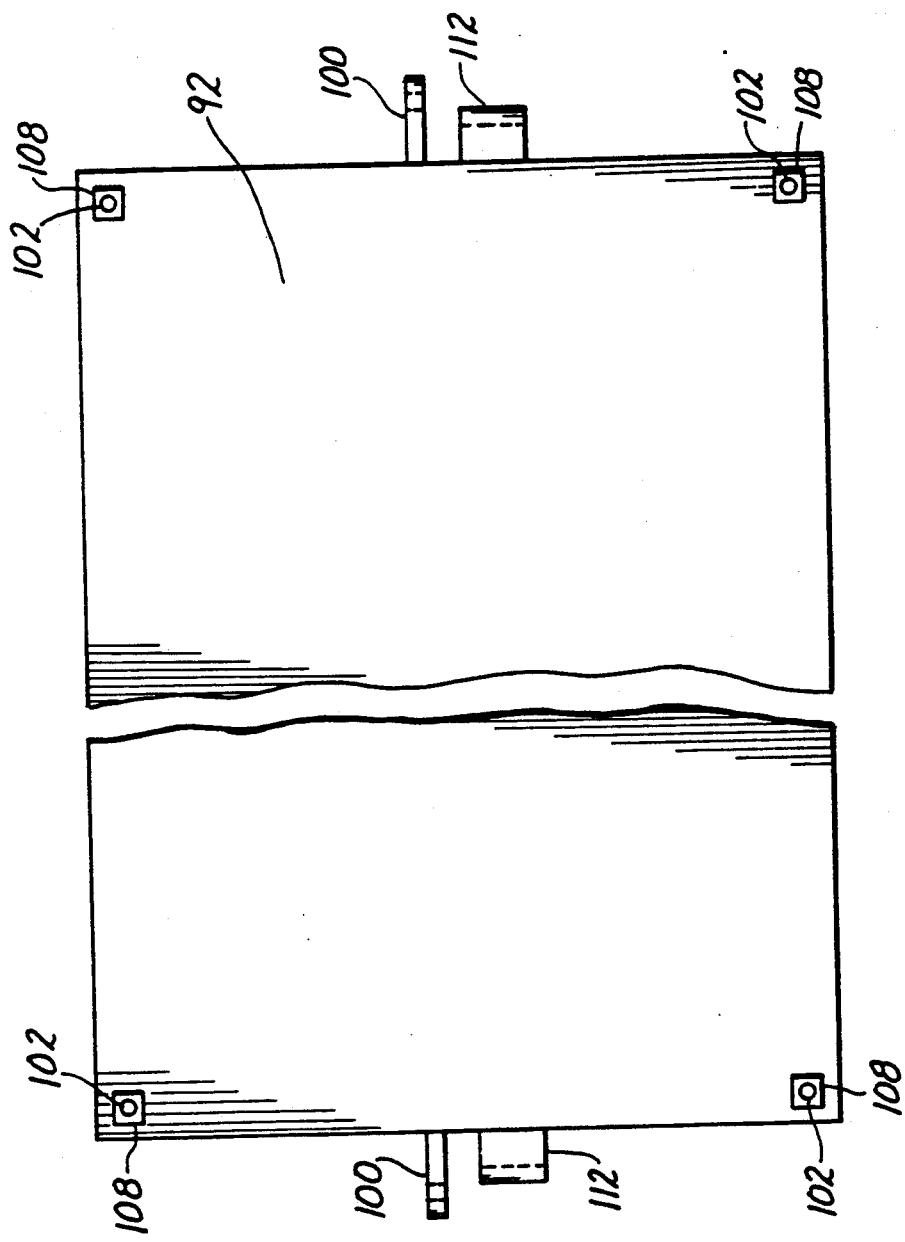
FIG. 9 is an enlarged front view of a single row mold.

FIG. 8 shows a schematic layout of an apparatus utilizing a series of single row molds of the type illustrated in FIGS. 10-13 inclusive and last described. An electric motor (not shown) drives sprockets 121 and 134, over which extend a pair of chain belts 122 and 124. Belt 122 carries a series of molds 92, each being spaced from adjacent molds 92 on approximately 8 inch centers. Belt 122 desirably operates in a step function method, preferrably controlled by a micro processor using proximity switches and timers for imputs with outputs to solenoid valves and clutch brake drives in a manner well understood by those skilled in the applicable art. The chain belt 124 carries the bar or rack 118 with the rods 124, with the latter being inserted into the mold cavities at point 126 in the mold circuit as hereinafter furthur described. A filler manifold 90 is provided just below the path of the lower ends 98 of the mold cavities 98. A ram station 128 serves to provide a wedge (not shown) which may be forced between the mold extensions 112 and 114 to split the mold halves 94 and 96.

In operation, the molding process is accomplished by delivering the mixed pulp from a static mixer (not shown) to the manifold 90 which has the number of manifolds coinciding with the number of mold cavities 98 and spacing to match the disposition of the mold cavities. While the mold cavities could be filled through the upper openings 98d, it is preferred to accomplish the filling of the molds through the lower ends 98a of the mold cavities 98 just prior to approach of the molds 92 to the manifold. At 126 a bar 118 with rods 116 is brought into alignment with a mold 92 and the rods 116 are lowered into the mold cavities 98 as the bar 118 is released from the belt 124. With the rods 116 in place, the mold 92 is moved another step to place the mold over the filler manifold 90. The latter is raised until the reduced diameter sections 98b of the mold cavities are sealed, whereupon product in the manifold 90, is pumped through the manifold and into the mold cavities 98 on a timed basis. The flow pressure of the product lifts the rods slightly to allow the product to pass in and around the rods 116. After the flow pressure stops, the rods 116 recede to dispose their ends back in in the tapered areas 98c to prevent product from passing back out of the molds 98 through the lower ends 98a. Each mold 92, as it is thus filled with product and with its rods 116 in place, continues along the belt path 130 in fixed time steps during which period the product solidifies in the molds and about the rods 116. At point 132, before the mold passes around its sprockets 134, the mold halves are forced apart by wedge shaped rams at station 128. Chain belt 124 then lifts the bar rack 118 with the product molded about the rods 116, from the mold cavities 98. Upon retraction of the rams, the compression springs 110 reclose the molds which are then carried further around the sprocket 134 and lower chain path 135 and back for refilling.

The chain belt 124 which is then carrying the bar 118 with its rods 116 and molded product 137 pass through a tannic acid tank 136, a product coloring tank 138 and a rinse tank 140, at which point the product has the color and texture desired. The belt 124 further carries the prepared product from the rinse tank 140 to the product removal station 142 in which a ram (not shown) extends a rake or cone fixture 144 between the rods 116, and when the chain 124 moves the rod 116 vertically upwardly, the rake 144 holds the product 137 to pull it from the rods and drop it into the water tank 142. The ram retracts prior to the finish step cycle to clear the bar in the next step cycle. The bar 118 and rods 116 with the product 137 thus removed are then carried by the chain belt 124 back for reinsertion in a mold 92 at point 126.

Tubes of the thus removed product 137 are carried out of the water tank 146 by a cleated conveyor (not shown) and the product 173 may be pushed through a vibrating wire cutter (also not shown) that has multiple wires set to the desired spacing width of the sliced product. The process thus described is shown in the block diagrams of FIGS. 2a and 3a, the former being for molding for the black ripe olive process, and FIG. 3a for the Spanish Style process. As may be seen, the molding steps 150, 152, 154, 156, 158 and 160 of FIG. 2a are the same as steps 150', 152', 154', 156', 158' and 160' of FIG. 3a. However, in the case of the Spanish Style process, after the rods 116' are removed from the product 137, a pimento filler is inserted in the rod cavity at 162' before the slicing or other culling step 164'.

It may thus be seen that the novel processes described enable culled olives or portions of olives which have heretofore been discarded as waste, to be reconstituted into edible and marketable olive type products, either of the black ripe or Spanish varieties. Thereby, a considerable saving may be effected for the olive farmer who customarily loses 10% to 12% of his crop through culling.

Moreover, a quality food product results to the advantage of both the processor and the public.

I claim:
1. The method of preparing culled olives for reconstitution as a black ripe olive edible food product, said method comprising the steps of:
   stemming, sorting and washing the olives;
   passing the olives into a pulper to remove the olive meat from the pits and discarding the pits;
   passing the depitted olive meat into an homogenizer to homogenize the pulp to a uniform consistency;
   vacuum filtering the homogenized pulp to remove the free liquid comprised of juice and oil;
   mixing the deliquified pulp with a 1% solution of sodium hydroxide;
   washing samples of the resultant mixture in fresh water periodically, and taste testing the sample until bitterness is minimized;
   further vacuum filtering the mixture to remove additional free liquid as the mixture is removed from the filter;
   adding a 1% solution of acidic acid and mixing the slurry until the slurry is stabilized at a pH of 6.5%;
   further filtering the stabilized slurry to remove additional free liquid;
   passing the pulp through an aceptic sterilization system and storing the pulp for a predetermined period of the order of from one to four months;
   removing the stored pulp from storage, and first washing it with fresh water and filtering it to remove the water;
   dividing the washed pulp into substantially equal quantities; passing each half of the pulp into a ribbon mixing tank, one half being mixed to a formula comprising 45% pulp, 51.2% demineralized water, 3% high guluronate alginate, and 0.8% sodium hexametaphosphate; and the second half of the pulp being mixed to a formula which comprises 45% pulp, 45.8% demineralized water, 3% olive oil, 4% of a dietary food grade cellulose fiber, 0.3% guar gum, 1.5% calcium sulphate and 0.4% calcium propionate;

pumping equal volumes of the two pulp formulas into a high shear mixer and:

delivering mixture to the barrel of an extruder;

extruding the pulp mixture from the extruder barrel;

spraying the extruded product first with a 1% solution of tannic acid, and secondly with a spray of ferrous gluconate;

washing the extruded product and cutting the washed product into the desired form of slices, wedges or dice.

2. The method as described in claim 1 in which the steps of storing the pulp for a predetermined period and removing the pulp from storage are omitted, so that the pulp, after passing through an aseptic sterilization system, is immediately first washed with water and filtered to remove the water, followed by the remaining steps set forth in said claim.

3. The method of preparing culled olives for reconstitution as as a black ripe olive edible food product, said method comprising the steps of:

stemming, sorting and washing the olives;

passing the olives into a pulper to remove the olive meat from the pits and discarding the pits;

passing the depitted olive meat into an homogenizer to homogenize the pulp to a uniform consistency;

vacuum filtering the homogenized pulp to remove the free liquid comprised of juice and oil;

mixing the deliquified pulp with a 1% solution of sodium hydroxide;

washing samples of the resultant mixture in fresh water periodically, and taste testing the sample until bitterness is minimized;

further vacuum filtering the mixture to remove additional free liquid as the mixture is removed from the filter;

adding a 1% solution of acidic acid and mixing the slurry until the slurry is stabilized at a pH of 6.5%;

further filtering the stabilized slurry to remove additional free liquid;

passing the pulp through and aseptic sterilization system and storing the pulp for a predetermined period of the order of from one to four months, removing the stored pulp from storage, and first washing it with fresh water and filtering it to remove the water:

dividing the washed pulp into substantially equal quantities; passing each half of the pulp into a ribbon mixing tank, one half being mixed to a formula comprising 45% pulp, 51.2% demineralized water, 3% high guluronate alginate, and 0.8% sodium hexametaphosphate; and the second half of the pulp being mixed to a formula which comprises 45% pulp, 45.8% demineralized water, 3% olive oil, 4% of a dietary food grade cellulose fiber, 0.3% guar gum, 1.5% calcium sulphate and 0.4% calcium propionate;

pumping equal volumes of the two pulp formulas into a high shear mixer and mixing;

delivering mixture to mold injecting means;

providing at least one separatable mold to receive and form the mixture into an elongated tubular shape about an axis said mold having extended therein a coaxial rod on or about which the mixture is formed and solidified as a tube after a predetermined time period;

opening the mold and removing the rod and tube of solidified mixture thereon;

passing the rod and tube of solidified mixture first through a bath of tannic acid, next through a bath of coloring, and finally through a rinse and;

removing the tube of solidified and treated mixture from the rod, and cutting the tube into desired product lengths.

4. The method as described in claim 3 in which the steps of storing the pulp for a predetermined period and removing the pulp from storage are omitted, so that the pulp, after passing through an aseptic sterilization system, is immediately first washed with water and filtered to remove the water, followed by the remaining steps set forth in said claim.

5. The method as described in claim 1 wherein extrusion is accomplished by a barrel having a concentric rod, thereby to produce a cylindrical product with a center bore.

6. The method of preparing culled olives for reconstitution as a Spanish type olive edible food product which comprises the steps of:

stemming, sorting and washing the olives;

passing the olives into a pulper to remove the olive meat from the pits and discarding the pits;

passing the depitted olive meat into an homogenizer to homogenize the pulp to a uniform consistency;

vacuum filtering the homogenized pulp to remove the free liquid comprised of juice and oil;

mixing the deliquified pulp with a 1% solution of sodium hydroxide;

washing samples of the resultant mixture in fresh water periodically, and taste testing the sample until bitterness is minimized;

further vacuum filtering the mixture to remove additional free liquid as the mixture is removed from the filter;

adding a 1% solution of acidic acid and mixing the slurry until the slurry is stabilized at a pH of 6.5%;

further filtering the stabilized slurry to remove additional free liquid;

placing the pulp in a storage tank into which a pickling solution is added and leaving the pulp in the tank, until fermentation is complete and the pH of the pulp stabilizes at between 3.5 and 4.0;

filtering the pulp and removing its free liquid;

delivering the pulp to a mixing tank with ingredients to comprise 45% olive pulp, 46.5% demineralized water, 3% olive oil, 4% of a dietary food grade cellulose fiber, 0.5% guar gum, 0.5% alginate extracted from seaweed, 0.25% calcium carbonate, 0.25% glucono delta lactone and adding olive juice to taste;

subjecting the thus mixed pulp to passage through a heat exchanger wherein its temperature is raised to approximately 175 to 180 degrees Fahrenheit;

preparing a pimento pepper stuffing by first stemming, seeding and pulping pimento peppers to a homogenous consistency, and mixing them with ingredients to a formula comprising 45% pimento pulp, 54.7% water, 0.2% alginate extracted from seaweed and 0.1% guar gum;

passing the mixed pimento pulp through a heat exchanger to raise its temperature to 175 to 180 degrees Fahrenheit;

pumping the olive pulp and pimento formula pulp into an extruder barrel having a cooling shell encasing it, said extruder comprising an outer tube into which the olive pulp is pumped, and a concentric inner shorter tube into which the pimento formula pulp is pumped;

extruding the olive pulp through the outer tube and the pimento pulp, through the shorter inner tube, thereby resulting in a continuous cylinder of olive meat having a pimento core;

spraying a 1% solution of tannic acid over the extruded product and spraying green food coloring over the product;

spraying fresh water on the product; and cutting the product into slices, wedges or dice.

7. The method of preparing culled olives for reconstitution as a Spanish type olive edible food product which comprises the steps of:

stemming, sorting and washing the olives;

passing the olives into a pulper to remove the olive meat from the pits and discarding the pits;

passing the depitted olive meat into an homogenizer to homogenize the pulp to a uniform consistency;

vacuum filtering the homogenized pulp to remove the free liquid comprised of juice and oil;

mixing the deliquified pulp with a 1% solution of sodium hydroxide;

washing samples of the resultant mixture in fresh water periodically, and taste testing the sample until bitterness is minimized;

further vacuum filtering the mixture to remove additional free liquid as the mixture is removed from the filter;

adding a 1% solution of acidic acid and mixing the slurry until the slurry is stabilized at a pH of 6.5%;

further filtering the stabilized slurry to remove additional free liquid;

placing the pulp in a storage tank into which a pickling solution is added and leaving the pulp in the tank, until fermentation is complete and the pH of the pulp stabilizes at between 3.5 and 4.0;

filtering the pulp and removing its free liquid;

delivering the pulp to a mixing tank with ingredients to comprise 45% olive pulp, 46.5% demineralized water, 3% olive oil, 4% of a dietary food grade cellulose fiber, 0.5% guar gum, 0.5% alginate extracted from seaweed, 0.25% calcium carbonate, 0.25% glucono delta lactone and adding olive juice to taste;

subjecting the thus mixed pulp to passage through a heat exchanger wherein its temperature is raised to approximately 175 to 180 degrees Fahrenheit;

preparing a pimento pepper stuffing by first stemming, seeding and pulping pimento peppers to a homogenous consistency, and mixing them with ingredients to a formula comprising 45% pimento pulp, 54.7% water, 0.2% alginate derived from seaweed and 0.1% guar gum;

passing the mixed pimento pulp through a heat exchanger to raise its temperature to 175 to 180 degrees Fahrenheit;

pumping the olive pulp and pimento formula pulp into mold injecting means;

providing at least one separatable mold to receive and form the mixture into an elongated shape, said mold having extruded therein a coaxial rod on and about which the mixture is formed and solidified as a tube after a predetermined time period;

opening the mold and removing the rod and tube of solidified mixture therein;

passing the rod and tube of solidified mixture first through a bath of tannic acid, next through a bath of coloring, and finally through a rinse;

and removing the tube of solidified and treated mixture from the rod, and cutting the tube into desired product lengths.

8. The method as described in claim 1 in which the steps of storing the pulp for a predetermined period and removing the pulp from storage are omitted, so that the pulp, after passing through an aseptic sterilization system, is immediately first washed with water and filtered to remove the water, followed by the remaining steps set forth in said claim.

* * * * *